March 6, 1951  J. E. FIELDEN  2,544,529
ELECTRICAL DETERMINATION OF MOISTURE
CONTENT AND OTHER PROPERTIES
Filed July 23, 1947  2 Sheets-Sheet 2

INVENTOR
J.E.Fielden
BY
ATTORNEYS

Patented Mar. 6, 1951

2,544,529

UNITED STATES PATENT OFFICE 2,544,529

ELECTRICAL DETERMINATION OF MOISTURE CONTENT AND OTHER PROPERTIES

John Ernest Fielden, Sale, England

Application July 23, 1947, Serial No. 763,078
In Great Britain July 31, 1946

4 Claims. (Cl. 175—183)

This invention relates to the electrical estimation of the moisture content, mass and other properties of textiles, paper and other materials.

One object of the invention is to provide a convenient and reliable means whereby the moisture content of a web of paper, textile fabric, or other hygroscopic material may be measured during or after the processing of the material, and a continuous check on the moisture content may be obtained.

A further object of the invention is to provide a means whereby the mass of textile slivers or rovings may be continuously measured.

According to the invention, use is made of the variation in impedance of a capacitance to high frequency electrical currents, due to variations in mass, moisture content and so forth of the dielectric of the capacitance. The textile or other material under test is used as the dielectric of the capacitance, and the variation in impedance is caused to produce a change in potential which is suitably amplified to operate a measuring instrument.

An apparatus according to the invention comprises a completely screened high frequency generator, a screened transformer fed from the generator and adapted to deliver high frequency current to two condensers connected in series, one of which has the material under test as its dielectric, a screened high frequency amplifier arranged to amplify variations in the potential of the junction of the two condensers due to variations in the dielectric constant of the material under test, and a measuring instrument for indicating such variations in potential.

Referring to the accompanying explanatory drawing.

Figure 1:
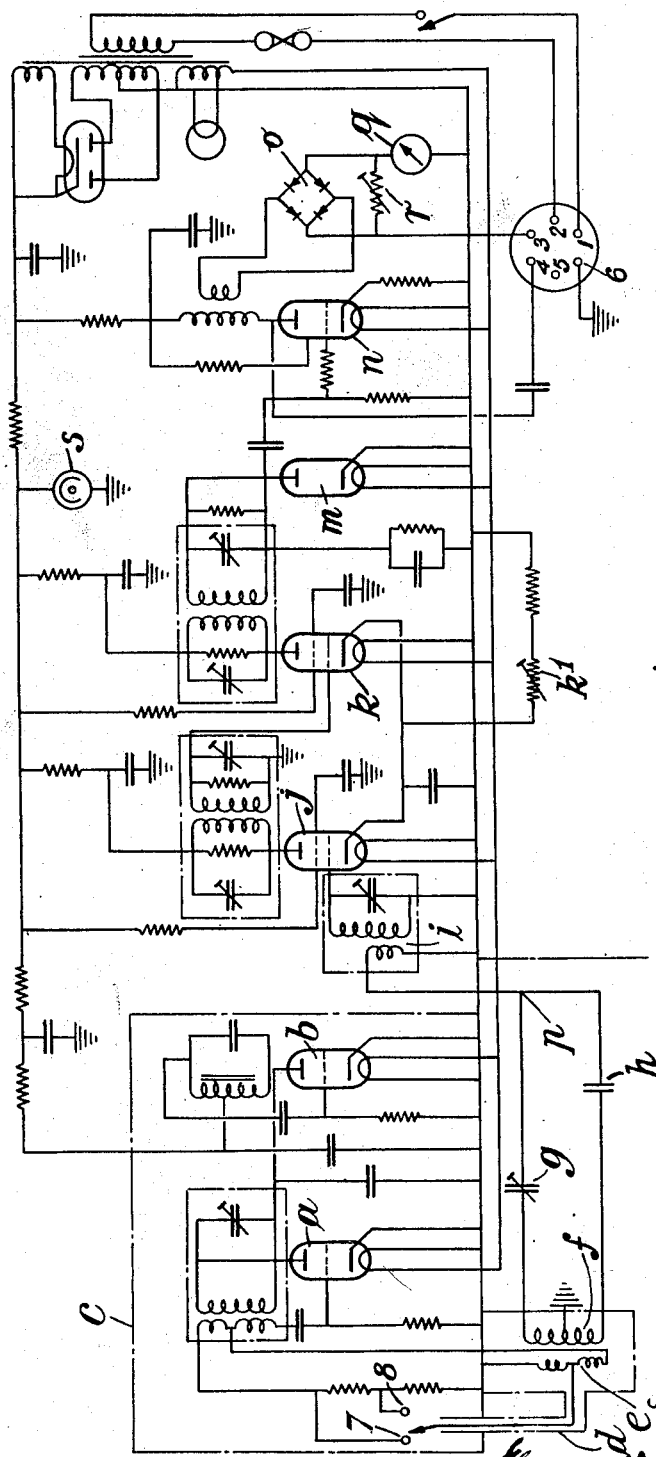
Figure 1 is a circuit diagram of an apparatus for measuring the moisture content of textile materials.

Referring to Figure 1 an oscillator valve $a$ and a modulator valve $b$ are employed to generate a current at a frequency of 500 kc. modulated at a frequency of 400 c., the valves and associated components being enclosed within a screen $c$. The modulated high frequency current is fed from a tapping 7 or 8 for drier or wetter conditions respectively, through a low impedance screened cable $d$ to the junction of two symmetrically arranged primary windings $e$ of a screened transformer the other ends of the windings being earthed. The secondary winding $f$ of the transformer has its centre point earthed, and one end is connected to a variable condenser $g$ and the other to a condenser $h$ consisting of two electrodes between which the material under test can be introduced. (See Figures 2 and 3). The other sides of the condensers $g$, $h$ are connected together at the point $p$, and to the primary of the input transformer $i$ of a tuned radio frequency amplifier incorporating two valves $j$, $k$ and having a variable resistance $k'$ serving as a gain control. The connections to the condenser $h$ are low impedance screened cables.

The amplifier output passes to a demodulator valve $m$ and a low frequency amplifying valve $n$ and then through a rectifier network $o$ to a measuring instrument $q$ and if desired to an external duplicate meter arranged at any convenient point. The meters are calibrated to indicate moisture content, from dry to 20% moisture. A variable resistance $r$ connected across the network $o$ provides for varying the input to the meter, to enable the calibration of the meter to be adapted to suit different materials.

Current for the operation of the instrument is obtained from an alternating current source, by means of normal rectifying and smoothing equipment, including a voltage stabiliser $s$. A base is provided to take a six-pin plug, in which the sockets 1 and 2 are for providing alternating current supply, 3 is for connections to an external meter, 4 is for connection if desired to means for automatically correcting the moisture content of the material under test, for example by controlling the speed of a cloth drying machine, 5 is left blank, and 6 is for earthing the external meter. The electronic equipment is housed in a metal case.

Figure 2:
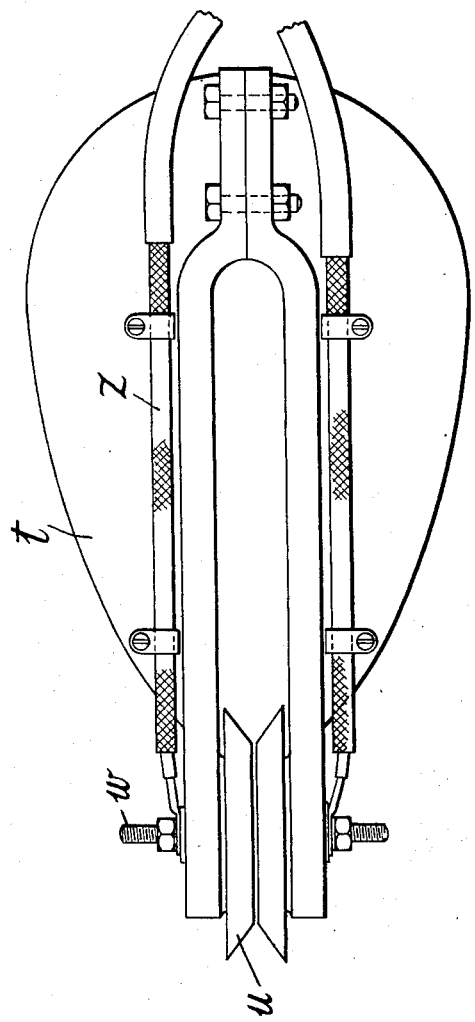
Figure 2 is a side elevation of the electrode assembly.
Figure 3:
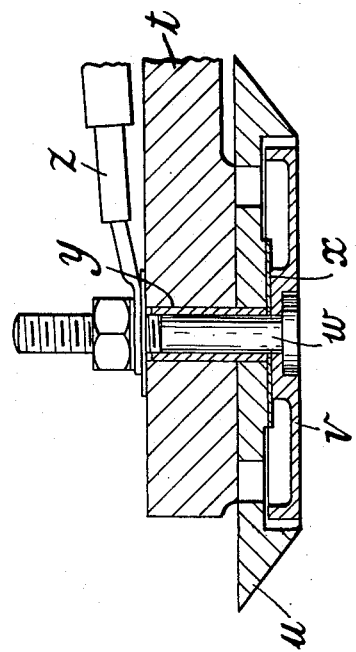
Figure 3 is a cross section of one of the electrodes.

The arrangement of the electrodes for testing continuous webs of textile fabrics is shown in Figures 2 and 3. A pair of brackets $t$ are bolted to a drying machine or the like, and carry two electrodes. Each electrode comprises a guard ring $u$ and a disc $v$ screwed to the bracket $t$ by a bolt $w$. The bolt $w$ and disc $v$ are insulated from the ring $u$ and bracket $t$ by a washer $x$ and sleeve $y$. The low impedance screened cables $z$ terminate in plugs, which are inserted in suitable sockets on the case housing the electronic equipment. One of the electrodes may be adjustably mounted in the bracket, so that the distance between the electrodes can be varied.

If the variable condenser $g$ is adjusted so that its capacity is equal to that of the test condenser $h$ in the absence of a test specimen, the potential of the junction point $p$ between the condensers relative to earth will be zero. The insertion of any material into the air space of the test condenser $h$ will increase its capacity and produce a voltage between $p$ and earth, sensibly proportional to the dielectric constant of the material. As the dielectric constant of water is much higher than that of cellulose and allied substances, the moisture content of the material will have a marked effect on the capacity of the test condenser and therefore on the voltage applied to the amplifier from the point $p$, and on the reading of the measuring instrument $q$.

The web of textile material coming from the drying machine or the like is caused to pass between the two electrodes. If possible the machine is stopped or run very slowly so that the outrun is dry, and the gain control $k'$ is adjusted until the meter points to "Dry." Then the machine is started and speeded up, until the meter records the desired moisture content. Alternatively the meter may be set to "Dry" with a dry sample of the fabric between the electrodes or a correctly humidified sample may be placed between the electrodes and the meter set to any mark on the scale, and the machine run at such a speed as to keep the needle at that mark.

It is essential that all parts of the apparatus including the leads from one part to another should be adequately screened, and if this is done the apparatus is very stable in operation. The screened transformer $e$, $f$, is so arranged that any phase shift of the voltage in the two halves of the secondary due to stray electrostatic coupling shall be symmetrical in relation to earth.

By means of this apparatus a continuous check on the moisture content of a web material passing between the test electrodes is obtainable.

A similar apparatus may be used for obtaining a continuous check on the mass of a textile sliver or roving which is passed between the test electrodes. In this case the variation in the capacity is due to the variation in the total mass of dielectric between the two electrodes at any time. For this purpose it is found convenient to use a higher frequency, of the order of 10 megacycles. The invention is applicable to the measurement of any property on which the dielectric constant of the material under test depends, and to any material which can serve as a dielectric.

The use of a high frequency in the method according to the invention gives the advantage that impedance of the test condenser is reduced to such a value that stability and accuracy can be obtained and the very small increments in capacity due to small increments in moisture content can be measured. It is possible to obtain reliable readings of humidity in increments of ½% or less down to complete dryness.

The use of a tuned amplifier renders the apparatus immune from inaccuracies or instability due to stray electrostatic fields and so forth. As the instrument is capable of being calibrated to complete dryness, this indication can be used as a datum line to adjust the apparatus for specimens which differ in quality and thickness, this adjustment being effected by a control of the gain of the amplifier.

What I claim is:

1. Apparatus for determining the mass, moisture content and similar properties of textiles, paper and other material comprising a screened electrical high frequency generator, a modulator for modulating the high frequency oscillations produced by the generator, a screened transformer fed from the generator, two condensers connected in series with the secondary winding of the transformer, one of which has the material under test as its dielectric, a screened high frequency amplifier arranged to amplify variations in the potential of the junction between the two condensers due to variations in the dielectric constant of the material under test, a demodulator for demodulating the amplified high frequency current, a rectifier for rectifying the low frequency current from the demodulator, and a measuring instrument for indicating the rectified variations.

2. Apparatus for determining the mass, moisture content and similar properties of textiles, paper and other material comprising a screened electrical high frequency generator, a modulator for modulating the high frequency oscillations produced by the generator, a screened transformer having two symmetrically arranged primary windings connected in series, the high frequency generator being connected to the junction of the two windings, the outer ends of which are earthed, and a secondary winding having its centre point earthed, two condensers connected in series between the ends of the secondary winding, one of which has the material under test as its dielectric, a screened high frequency amplifier arranged to amplify variations in the potential of the junction between the two condensers due to variations in the dielectric constant of the material under test, a demodulator for demodulating the amplified high frequency current, a rectifier for rectifying the low frequency current from the demodulator, and a measuring instrument for indicating the rectified potential variations.

3. Apparatus as claimed in claim 1, and in which the rectifier is a metal oxide rectifier network with a variable resistance connected across the network for varying the input to the measuring instrument and enabling the calibration thereof to be adapted to suit different materials.

4. Apparatus as claimed in claim 1, and having low impedance cables and screens closely surrounding and insulated from the conductors of the cables, for connecting the screened transformer to the high frequency generator and for connecting the plates of the test condenser to the circuit.

JOHN ERNEST FIELDEN.

REFERENCES CITED

The following references are of record in the file of this patent:

UNITED STATES PATENTS

| Number | Name | Date |
| --- | --- | --- |
| Re. 21,003 | Knerr et al. | Feb. 14, 1939 |
| 1,984,166 | Walter | Dec. 11, 1934 |
| 2,241,190 | Fenning | May 6, 1941 |
| 2,285,152 | Firestone | June 2, 1942 |
| 2,373,846 | Olken | Apr. 17, 1945 |
| 2,381,155 | Frommer | Aug. 7, 1945 |
| 2,422,742 | Odessey | June 24, 1947 |
| 2,428,700 | Eilenberger | Oct. 7, 1947 |
| 2,432,811 | Sams | Dec. 16, 1947 |
| 2,478,773 | McDill | Aug. 9, 1949 |